United States Patent [19]

Miyajima et al.

[11] Patent Number: 5,048,894
[45] Date of Patent: Sep. 17, 1991

[54] SEAT FOR SPECIAL VEHICLE

[75] Inventors: Iwao Miyajima; Kenzo Shimada; Kazuo Shimizu; Hiroshi Moriyama; Tatsuya Tokuda, all of Saitama, Japan

[73] Assignees: Tokyo Seat Corp., Ltd., Saitama; Honda Giken Kogyo Kabushiki Kaisha, Tokyo, both of Japan

[21] Appl. No.: 435,141

[22] Filed: Nov. 9, 1989

[30] Foreign Application Priority Data

Nov. 9, 1988 [JP] Japan .............. 63-146292[U]

[51] Int. Cl.⁵ .............................................. A47C 7/02
[52] U.S. Cl. .................................. 297/460; 297/452
[58] Field of Search ............... 297/460, 459, 452, 443, 297/218, 326

[56] References Cited

U.S. PATENT DOCUMENTS

| Re. 16,180 | 10/1975 | Chapman et al. | 297/376 X |
|---|---|---|---|
| 2,160,015 | 5/1939 | Haberstump | 297/325 X |
| 3,182,377 | 5/1965 | Hoven et al. | 297/460 X |
| 3,195,955 | 7/1965 | Richardson et al. | 297/460 X |
| 3,503,649 | 3/1971 | Johnson | 297/459 |
| 4,383,714 | 5/1983 | Ishida | 297/325 |
| 4,519,650 | 5/1985 | Terada et al. | 297/452 |
| 4,592,588 | 6/1986 | Isono et al. | 297/460 X |
| 4,753,482 | 6/1988 | Warren | 297/460 X |

FOREIGN PATENT DOCUMENTS

| 3130474 | 2/1983 | Fed. Rep. of Germany | 297/452 |
|---|---|---|---|
| 1232409 | 10/1960 | France | 297/443 |
| 610780 | 10/1960 | Italy | 297/452 |

Primary Examiner—José V. Chen
Attorney, Agent, or Firm—Helfgott & Karas

[57] ABSTRACT

A seat for a special vehicle, includes a seat back, a seat cushion, and a pair of elongated stays for interconnecting the seat back and the seat cushion. The seat back includes a back frame, a first cushioned padding having lower and upper sections, the lower section having bulged portions formed at its left and right side portions by bulging the left and right side portions to a relatively large degree in a manner to allow the lower section to have a substantially C-shape in cross section, and a first covering sheet covering the first cushioned padding therethrough, the first cushioned padding, covered with the first covering sheet, being attached to the back frame. The seat cushion includes a bottom frame, a second cushioned padding which has ridge portions formed at its left and right side portions and extending from portions of a rear end of the second cushioned padding to the approximately middle portions along the left and right side portions of the second cushioned padding, and a second covering sheet covering the second cushioned padding therethrough, the second cushioned padding, covered with the second covering sheet, being attached to the bottom frame. A pair of the stays are obtuse-angularly curved, upper portions of which stays are inserted from portions of a bottom of the seat back into the seat back and lower portions of which stays are inserted from to surface portions of the seat cushion near a rear end of the seat cushion, whereby the seat back interconnected and obliquely supported to the seat cushion.

19 Claims, 6 Drawing Sheets

SEAT FOR SPECIAL VEHICLE

BACKGROUND OF THE INVENTION

1. Field of the Invention

This invention relates to an improvement of a seat which is used in a special vehicle such as a tractor, a mowing vehicle or the like.

2. Description of the Prior Art

Generally, when an operator drives a special vehicle of this type to work in the fields, the operator sitting on a seat of the vehicle is obliged to frequently move his body in order to look to the sides and/or the rear except the front. Especially, when the operator is required to turn the vehicle around during driving, he has to excessively twist the upper half of his body in order to look to the rear.

Figure 1:
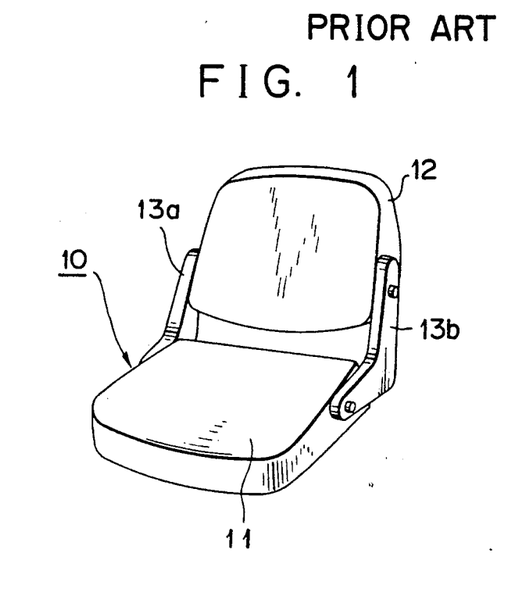
FIGS. 1 and 2 are each a schematic perspective view of a conventional seat for a special vehicle.
Figure 2:
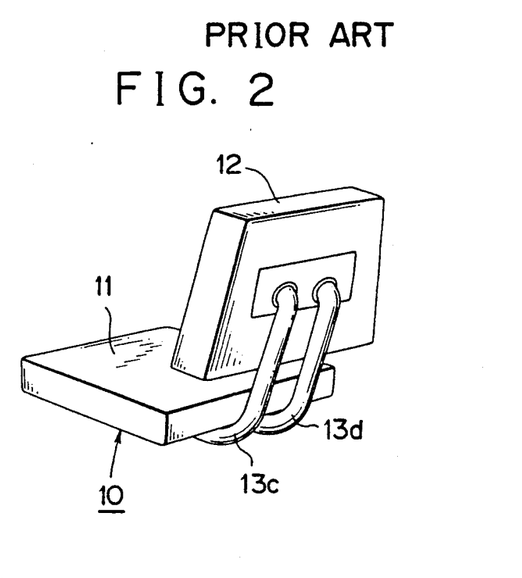

Referring now to FIGS. 1 and 2, two conventional seats for a special vehicle of this type will be described in order to facilitate understanding of the present invention. In FIG. 1, a seat 10 includes a seat cushion 11 flatwise formed as a whole, and a seat back 12 flatwise formed as a whole. The flat seat back 12 is interconnected to the flat seat cushion 11 by a pair of bracket plates 13a and 13b which are located in a manner to extend between a left side of the seat cushion 11 and a left side of the seat back 12 and between a right side of the seat cushion 11 and a right side of the seat back 12, respectively, and fixed to the seat cushion 11 and the seat back 12 by means of pins. In FIG. 2, a seat 10 includes a flat seat cushion 11, and a flat seat back 12 supported at its rear side portion by bracket arms 13c and 13d extending upwardly from an underside of the seat cushion 11. In each of the conventional seats shown in FIGS. 1 and 2, the entire seat back 12 is flatwise formed as described above, so that when an operator is obliged to twist the upper half of his body as described above, the seat back 12 will not be capable of stably supporting the operator. This causes the operator to be exceedingly fatigued where he drives the vehicle for many hours. Also, in each of the conventional seats, the seat cushion 11 is flatwise formed as described above, so that an operator, sitting on the seat cushion 11, can freely move his feet in order to depress pedals of the vehicle. However, when the operator is required to turn the vehicle around as described above, the seat cushion 11 will allow his hip to be moved from side to side thereon because the seat cushion 11 is flatwise formed. This makes it hard for the operator to stably drive the vehicle and inevitably causes the operator to be fatigued. Moreover, in the conventional seats, the bracket plates 13a and 13b, and the bracket arms 13c and 13d are exposed to the outside, so that the conventional seats may not strike people as goods of higher grade.

SUMMARY OF THE INVENTION

The present invention has been made with a view to overcoming the foregoing problems of the prior art seats.

It is therefore an object of this invention to provide a seat for a special vehicle which will ensure an operator a stable and comfortable seating without injuring the operability of the seat.

It is another object of this invention to provide a seat for a special vehicle which is of fine appearance.

It is still another object of this invention to provide a seat for a special vehicle which is easily manufactured.

In accordance with the present invention, a seat for a special vehicle is provided. The seat comprises a seat back, a seat cushion, and means for interconnecting the seat cushion and the seat back. The seat back includes a back frame, a first cushioned padding having lower and upper sections, the lower section having bulged portions formed at its left and right side portions by bulging the left and right side portions to a relatively large degree in a manner to allow the lower section to have a substantially C-shape in cross section, and a first covering sheet covering the first cushioned padding therethrough, the first cushioned padding, covered with the first covering sheet, being attached to the back frame. The seat cushion includes a bottom frame, a second cushioned padding which has ridge portions respectively formed at its left and right side portions and extending from portions of a rear end of the second cushioned padding to the approximately middle portions along the left side portion and along the right side portion, and a second covering sheet covering the second cushioned padding therethrough, the second cushioned padding, covered with the second covering sheet, being attached to the bottom frame. The means includes a pair of elongated stays obtuse-angularly curved, upper portions of which stays are inserted from portions of a bottom of the seat back into the seat back and lower portions of which stays are inserted from top surface portions of the seat cushion near a rear end of the seat cushion into the seat cushion, whereby the seat back is interconnected and obliquely supported to the seat cushion.

Each of the stays is surrounded at its portion, which is exposed between a top surface portion of the seat cushion and a bottom portion of the seat back, by a grommet.

The upper portions of the stays may be inserted in the seat back in a manner to positionally correspond to ones of the respective bulged portions of the first cushioned padding and secured to the back frame, and the lower portions of the stays may be inserted in the seat cushion in a manner to positionally correspond to ones of the respective ridge portions of the second cushioned padding and secured to the bottom frame.

The bottom frame may be provided with recess portions, in ones of which respective recess portions the lower portions of the stays are fitted and secured to the bottom frame.

The upper portions of the stays which are inserted into the seat back may gradually curved in an upper rear direction from its portion, positionally correspond to ones of the respective bulged portions of the first cushioned padding, so as to be stepped.

The first cushioned padding covered with the first covering sheet is attached to the back frame by means of a first belt molding, and the second cushioned padding covered with the second covering sheet is attached to the bottom frame by means of a second belt molding. The first belt molding may be arranged along a periphery of the back frame and curved forwardly at its portions, positionally corresponding to the bulged portions of the first cushioned padding, in a manner to have the substantially same curvature as that of curved surfaces of the bulged portions of the first cushioned padding, thereby allowing the bulged portions of the first cushioned padding to be held their shape as they are, so that the seat back has bulged portions rising to a relatively higher degree at its left and right side portions positionally corresponding to the bulged portions of the first cushioned padding, comparing with its central portion positionally corresponding to a central portion of the lower section of the first cushioned padding.

The seat may include at least one means for tilting the seat. The at least one tilting means includes a first elongated member attached to the bottom frame and a second elongated member pivotably connected at its one end portion to the first elongated member and pivotably connected at the other end portion thereof to a floor of the vehicle.

BRIEF DESCRIPTION OF THE DRAWINGS

Other objects and many of the attendant advantages of the present invention will be readily appreciated as the same becomes better understood by reference to the following detailed description when considered in connection with the accompanying drawings, in which like reference numerals designate the same parts throughout the Figures and wherein.

DETAILED DESCRIPTION OF THE PREFERRED EMBODIMENT

Figure 3:
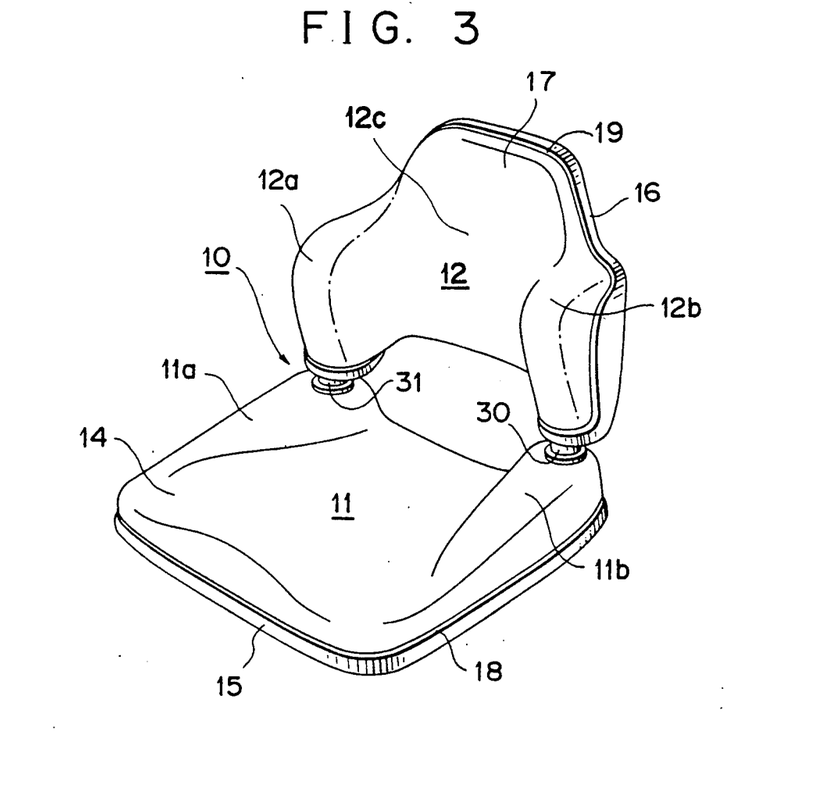
FIG. 3 is a schematic perspective view of a seat for a special vehicle according to the present invention.

Referring now to FIG. 3, there is schematically illustrated a seat 10 according to the present invention which is used in a special vehicle such as a tractor, a mowing vehicle or the like. The seat 10 includes a seat cushion 11, and a seat back 12 which is formed separately from the seat cushion 11 but interconnected to the seat cushion 11 by a pair of stays as will be described in greater detail hereinafter.

Each of the seat cushion 11 and the seat back 12 comprises a frame made of resin material, e.g., polypropylene, a covering sheet made of, e.g., polyvinyl chloride, and a cushioned padding formed from, e.g., a urethane foam and covered by the covering sheet to be attached to the frame.

Figure 4:
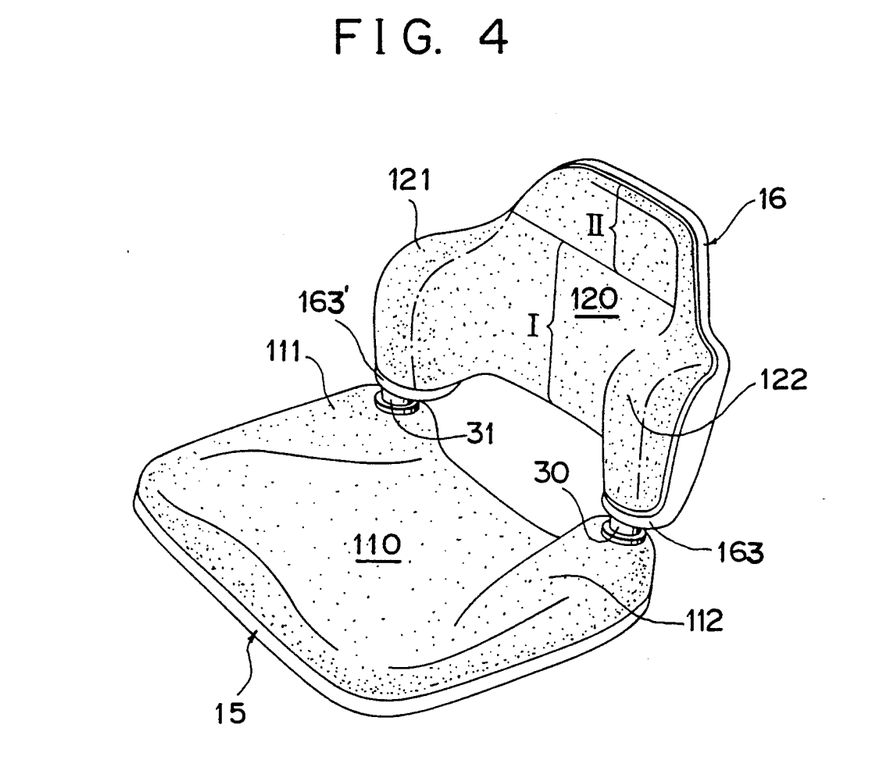
FIG. 4 is a schematic perspective view showing a cushioned padding of a seat back and a cushioned padding of a seat cushion, in which a covering sheet for the cushioned padding of the seat back and a covering sheet for the cushioned padding of the seat cushion are removed for clarity of illustration.
Figure 5:
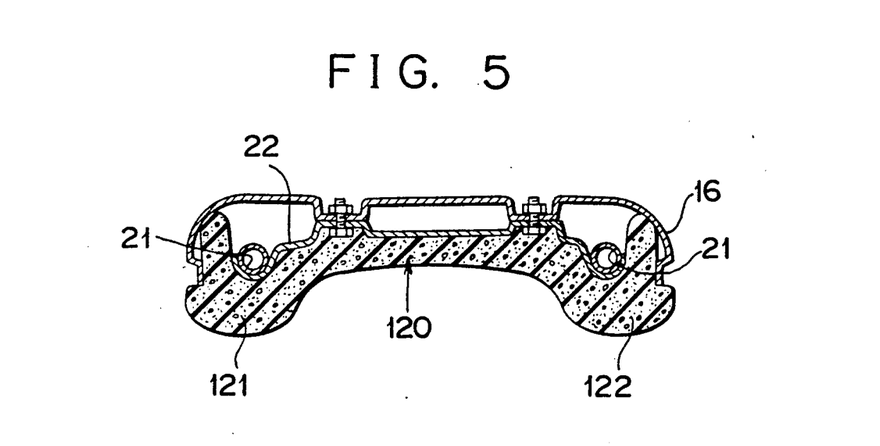
FIG. 5 is a schematic cross-sectional view of the cushioned padding of the seat back shown in FIG. 4.

Referring to FIG. 4, a cushioned padding 110 of the seat cushion 11 comprises a substantially square-shaped body which has ridge portions 111 and 112 respectively formed at its left and right side portions by bulging the left and right side portions to a relatively large degree. More particularly, the ridge portions 111 and 112 extend from portions of a rear end of the substantially square-shaped body to the approximately middle portions along the left and right side portions of the body in a manner to descend by a gradual slope in a forward direction. Thus, the cushioned padding 110 is substantially flat at its forward section. The padding 110 shaped in the manner described above is covered by a sheet 14 of covering material, as shown in FIG. 3, to be attached to a bottom frame 15 which is interconnected to a back frame 16 by means of a pair of stays. A cushioned padding 120 of the seat back 12 is made up of a lower section I and an upper section II, left and right side portions 121 and 122 of which lower section I are bulged to a relatively large degree in a manner such that the lower section I has a substantially C-shape in cross section as shown in FIG. 5. The upper section II of the padding 120 is relatively flat. The padding 120 shaped in the manner described above is covered by a sheet 17 of covering material, as shown in FIG. 3, to be attached to the back frame 16.

The attachment of the paddings 110 and 120 to the bottom frame 15 and the back frame 16 is carried out using belt moldings 18 and 19 as shown in FIG. 3. The attachment may be performed using elongated open trims as will be described later. Since the attachment of the padding 110 to the bottom frame 15 is effected in the substantially same manner as the attachment of the padding 120 to the back frame 16 is done, the attachment of the padding 120 to the back frame 16 will be referred to in the following.

Figure 6:
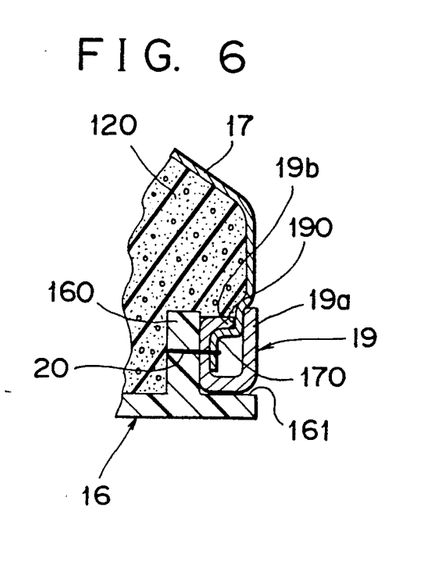
FIGS. 6 and 7 are each a schematic enlarged fragmentary sectional view of assistance in explaining the attachment of the cushioned padding to a frame.
Figure 7:
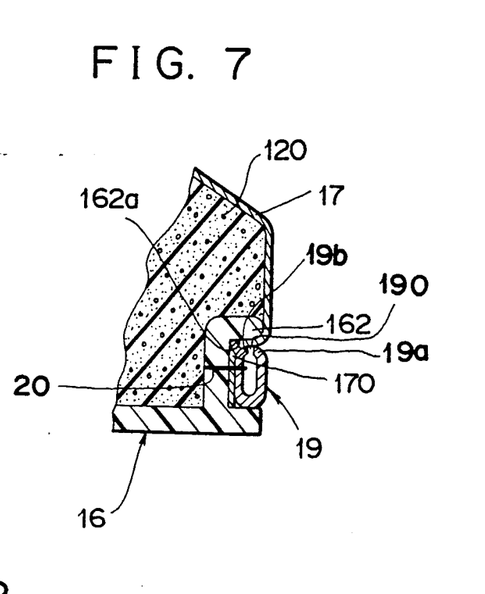

Referring now to FIG. 6, the back frame 16 has a peripheral rising portion 160 and a peripheral step portion 161 formed by partially cutting out the peripheral rising portion 160, on which peripheral step portion 161 the belt molding 19 briefly described above is arranged in a manner to surround the peripheral rising portion 160 as shown in FIG. 3. The belt molding 19 is of a substantially O-shape in vertical section, made of flexible resin material to be deformable and has a slit 190 formed along its longitudinal direction. The attachment of the padding 120, covered with the covering sheet 17, to the back frame 16 is effected by deforming outward one 19a of both end portions of the belt molding 19, between which both end portions the slit 190 is formed, in a manner to cause the end portion 19a to be moved away from the other end portion 19b of the belt molding 19 thereby opening the belt molding 19 at the slit 190, and inserting a terminal portion 170 of the covering sheet 17 into the opened belt molding 19 to fasten the terminal portion 170 of the covering sheet 17 together with the belt molding 19 to the peripheral rising portion 160 of the back frame 16 by means of tacker pins 20 (only one is shown in FIG. 6). In the example shown in FIG. 6, the terminal portion 170 of the covering sheet 17 is held between the both end portions 19a and 19b of the belt molding 19 and secured together with the belt molding 19 to the back frame 16 by the tacker pins 20, whereby the padding 120 is securely attached to the back frame 16. Alternatively, the attachment of the padding 120 to the back frame 16 may be performed in a manner shown in FIG. 7. In FIG. 7, parts which are similar to those shown in FIG. 6 are designated with like reference numerals and the description of them will not be repeated. Referring to FIG. 7, the back frame 16 has a peripheral rising portion 162 of a substantially C-shape in vertical section formed along its periphery. In the example being illustrated in FIG. 7, the attachment of the padding 120, covered by the covering sheet 17, to the back frame 16 is effected by inserting the terminal portion 170 of the covering sheet 17 into a recess portion 162a of the rising portion 162 of the back frame 16, fitting the belt molding 19 in the recess portion 162a in a manner to cause the terminal portion 170 of the covering sheet 17 to be applied to the rising portion 162 of the back frame 16 by the belt molding 19 and deforming outward the end portion 19a of the belt molding 19 in a manner to cause the end portion 19a to be moved away from the other end portion 19b of the belt molding 19 thereby opening the belt molding 19 at the slit 190, and inserting tacker pins 20 (only one is shown in FIG. 7) into the opened belt molding 19 to fasten the belt molding 19 together with the terminal portion 170 to the rising portion 162 by means of the tacker pins 20. In the example shown in FIG. 7, when the belt molding 19 having a height (measured in a vertical direction in FIG. 7) slightly more than that of the recess 162a of the rising portion 162 is employed, this will ensure tight fitting of the belt molding 19 into the recess portion 162a of the back frame 16.

Figure 8:
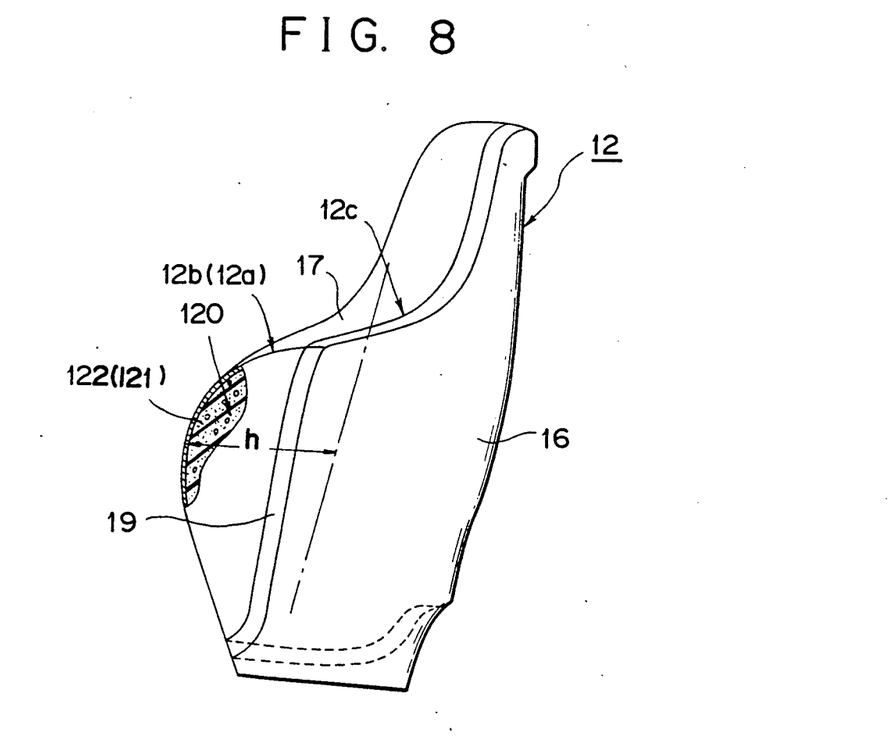
FIG. 8 schematically shows an enlarged side view of the seat back with a portion of the covering sheet thereof cut away.

Referring to FIG. 8, the belt molding 19 secured along the peripheral portion of the back frame 16 in the manner described above is curved at its portions, which positionally correspond to the bulged portions 121 and 122 of the padding 120 covered by the covering sheet 17. More particularly, the portions of the belt molding 19 are curved in a manner to have the substantially same curvature as that of curved surfaces of the bulged portions 121 and 122 of the padding 120, so that the covering sheet 17 which is fastened at its terminal portion 170 to the back frame 16 through the belt molding 19 and the tacker pins 20 is uniformly pulled. Thus, the seat back 12 in which the bulged portions 121 and 122 of the padding 120 are held their shape as they are can be produced. Specifically, the seat back 12 in which left and right side portions 12a and 12b (see FIG. 3) of the seat back 12 have a height h relatively more than that of a central portion 12c of the seat back 12 can be produced.

Figure 9:
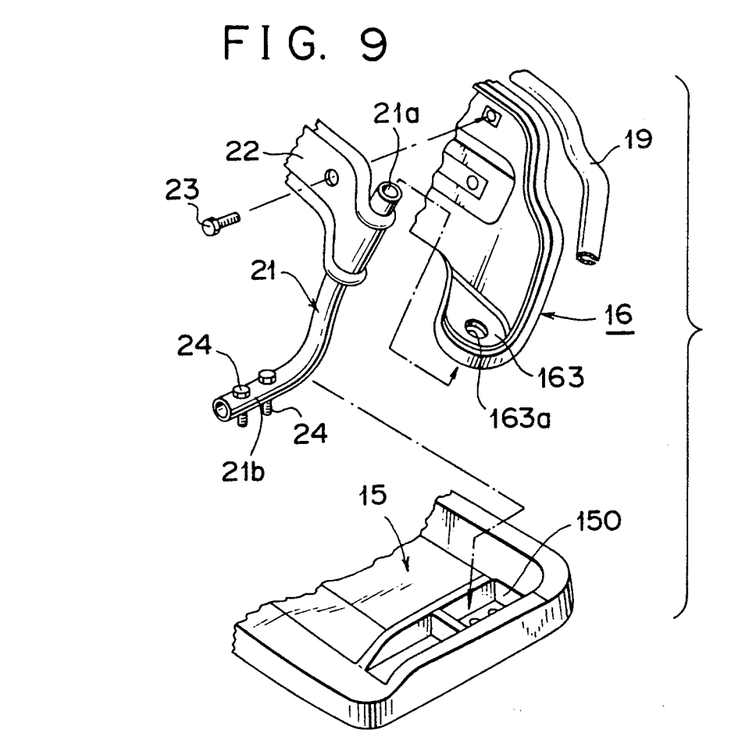
FIG. 9 is a schematic exploded segmentary perspective view of the seat shown in FIG. 3, in which the cushioned padding of the seat back and the cushioned padding of the seat cushion are removed for clarity of illustration.

Referring to FIG. 9, the interconnection of the bottom frame 15 and the back frame 16 will be described. In FIG. 9, only the approximately right half of the back frame 16 which has a base section 163 formed integrally therewith is shown, but it should be understood that the approximately left half of the back frame 16 which is not shown in this Figure has a second base section 163' (see FIG. 4) which is formed in the substantially same manner as the base section 163 is done. The base sections of the back frame 16 serve to support thereon the bulged portions 121 and 122 of the padding 120, when the padding 120 is attached to the back frame 16 for assembly. The base section 163 is formed with a hole 163a. Also, the unshown base section has the substantially same hole as the base section 163 has. Similarly, in FIG. 9, only the approximately right half of the bottom frame 15 which has a recess portion 150 formed at its portion near a rear end of the bottom frame 15 is shown, but it should be understood that the left half of the bottom frame 15 which is not shown in this Figure has a second recess portion which is formed in the substantially same manner as the recess portion 150 is done. The interconnecting of the seat cushion 11 and the seat back 12 is carried out by a pair of stays 21 (only one is shown in FIG. 9), which are attached to the bottom frame 15 and the back frame 16, each of which stays 21 is of a substantially tubular form and obtuse-angularly curved in a manner to allow the back frame 16 to be supported obliquely to the bottom frame 15 therethrough. More particularly, the attaching of the stay 21 to the back frame 16 and the bottom frame 15 is effected by inserting an upper portion 21a of the stay 21 through the hole 163a of the back frame 16 and applying the upper portion 21a to the back frame 16 by means of a mounting plate 22 to fasten the mounting plate 22 to the back frame 16 by a bolt 23, and fitting a lower portion 21b of the stay 21 into the recess portion 150 of the bottom frame 15 to secure the lower portion 21b to the bottom frame 15 by means of bolts 24. The unshown stay is attached to the back frame 16 and the bottom frame 15, in the substantially same manner as the stay 21 shown in FIG. 9 is done, by inserting an upper portion of the unshown stay through the unshown hole of the back frame 16 and fitting a lower portion of the unshown stay into the unshown recess portion of the bottom frame 15. The mounting plate 22 is laid across the stays. The cushioned padding 110 is arranged on the bottom frame 15 in a manner such that ridge portions 111 and 112 of the padding 110 positionally correspond to the lower portions of the respective stays. The cushioned padding 120 is arranged on the back frame 16 in a manner such that the bulged portions 121 and 122 of the padding 120 positionally correspond to the upper portions of the respective stays. In the illustrated embodiment, the bottom frame 15 is provided with the recess portions as described above, thereby providing stiffness, and the lower portions of the stays are fitted into the respective recess portions of the bottom frame 15, so that even though a cushioned padding which is relatively thin is employed to be attached to the bottom frame 15 the lower portions of the stays will not permit an operator, sitting on the seat cushion 11, to have a feeling of physical disorder.

Figure 10:
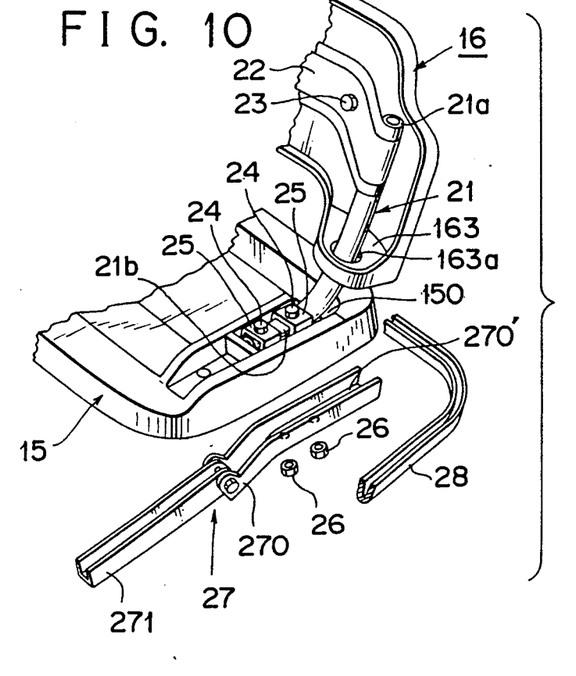
FIG. 10 is a schematic exploded segmentary perspective view showing a modification of the seat shown in FIG. 3, in which the cushioned padding of the seat back and the cushioned padding of the seat cushion are removed for clarity of illustration.
Figure 11:
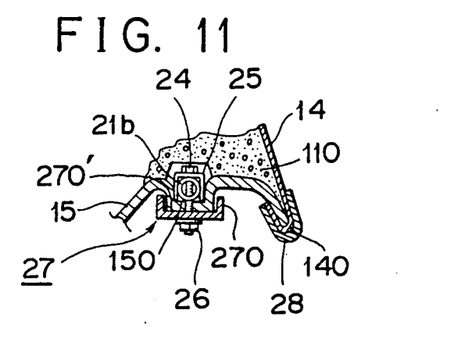
FIG. 11 is a schematic fragmentary sectional view of a seat cushion of the seat shown in FIG. 10.

Referring to FIGS. 10 and 11, there is schematically illustrated a modification of the example shown in FIG. 9. This modification is substantially similar to the example shown in FIG. 9 except that different fastening means for fastening the lower portions of the stays 21 to the bottom frame 15, and means for tilting the seat are employed. In the modification of FIGS. 10 and 11, parts which are similar to those shown in FIG. 9 are designated with like reference numerals and the description of them will not be repeated. In this modification, the fastening of the lower portion 21b of the stay 21 to the bottom frame 15 is effected by fitting the lower portion 21b into the recess portion 150 of the bottom frame 15, fitting substantially inverted U-shape brackets 25 on the lower portion 21b of the stay 21 and threading bolts 24 through the brackets 25, the lower portion 21b of the stay 21 and a bottom of the recess portion 150 to threadedly fit nuts 26 on the respective bolts 24. In the illustrated example, each of the recess portion 150 and the unshown recess portion of the bottom frame 15 is formed in a manner to be swelled in a downward direction as shown in FIG. 11. In FIGS. 10 and 11, reference numeral 27 denotes hinge means which serves as means to tilt the seat and is located below the downwardly swelled recess portion 150 of the bottom frame 15. The hinge means 27 comprises a first elongated member 270 having a substantially U-shape in vertical section, and a second elongated member 271. The first elongated member 270, when the lower portion 21b of the stay 21 is fixed to the bottom frame 15 by means of the bolts 24 and the nuts 26, is also attached by means of the bolts 24 and the nuts 26 to the downwardly swelled recess portion of the bottom frame 15 in a manner to receive the downwardly swelled recess portion 150 in its U-shaped opening 270'. The second elongated member 271 is pivotably connected at one end portion thereof to a floor (not shown) of a special vehicle, on which the seat is arranged, through any suitable joining means (not shown) and pivotably connected at the other end portion thereof to the first elongated member 270. It should be understood that second hinge means is also located below the unshown swelled recess portion of the bottom frame 15 and that the second hinge means is constructed and arranged in the same manner as the hinge means 27 is done. Incidentally, in FIGS. 10 and 11, the attachment of the padding 110 to the bottom frame 15 is carried out by wrapping a terminal portion 140 of the covering sheet 14 around a peripheral portion of the bottom frame 15 and bringing an elongated open trim 28, briefly described above, into mesh with the peripheral portion of the bottom frame 15 which is wrapped around by the terminal portion 140 of the covering sheet 14 as described above.

Figure 12:
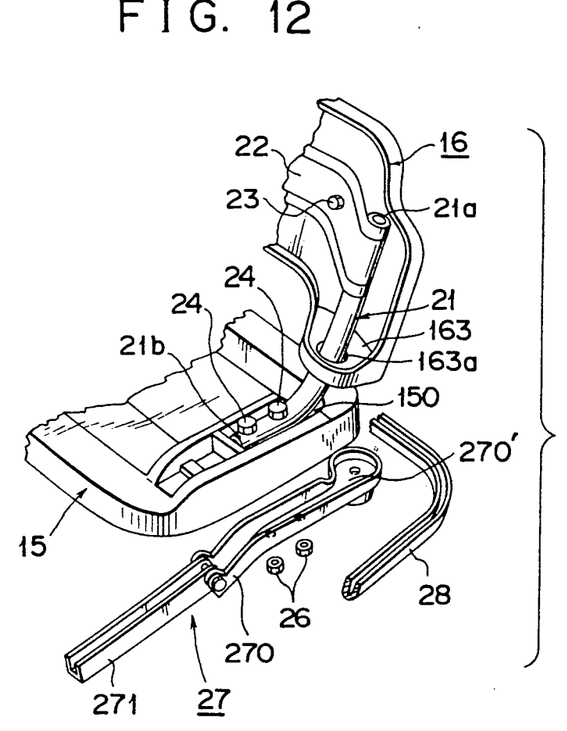
FIG. 12 is a schematic exploded segmentary perspective view showing a further modification of the seat shown in FIG. 10, in which the cushioned padding of the seat back and the cushioned padding of the seat cushion are removed for clarity of illustration.
Figure 13:
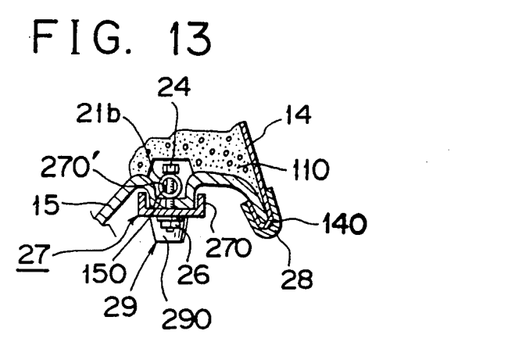
FIG. 13 is a schematic fragmentary sectional view of a seat cushion of the seat shown in FIG. 12.

Referring to FIGS. 12 and 13, there is schematically a further modification of the example shown in FIG. 9. This modification is substantially similar to the example shown in FIGS. 10 and 11 except that the bolts 24 for fastening the lower portion 21b of the stay 21 to the bottom frame 15 are welded to the lower portion 21b of the stay 21 and a shock absorber 29 is mounted on the bottom surface of the first elongated member 270 of the hinge means 27. The shock absorber 29 comprises a body 290 made of rubber, and a bolt (not shown) projecting upward from the body 290, which bolt is threaded through the first elongated member 270 and the bottom frame 15, whereby the shock absorber 29 is mounted on the bottom surface of the first elongated member 270. It should be understood that a second shock absorber is also mounted on the bottom surface of the first elongated member of the unshown second hinge means. The shock absorber serves as means to absorb any shock which may be applied to the seat 10 when the seat 10 is tilted by the hinge means to be abutted against the floor of the special vehicle.

Figure 14:
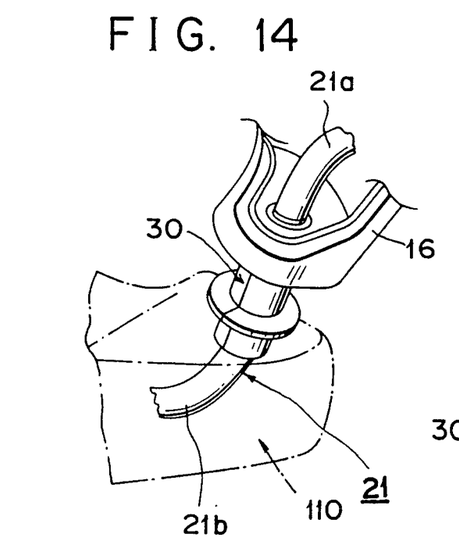
FIG. 14 is a schematic enlarged segmentary perspective view of a stay.
Figure 15:
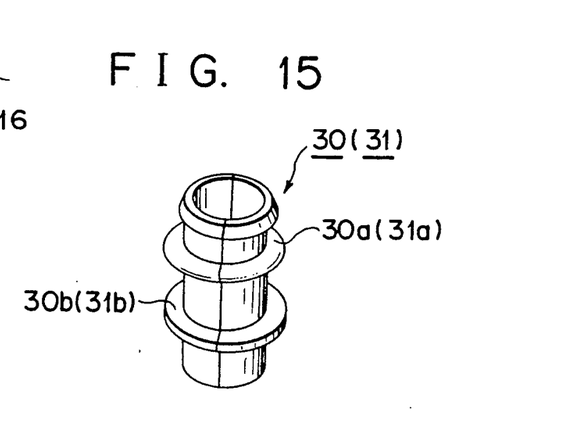
FIG. 15 is a schematic perspective view of a grommet.

Referring to FIG. 14, a portion of the stay 21 which is exposed between the seat cushion and the seat back is surrounded by a grommet 30, resulting in the entire stay 21 being concealed as shown in FIG. 3. As shown in FIG. 3, a portion of the other stay not shown in FIG. 14 which is exposed between the seat cushion 11 and the seat back 12 is also surrounded by a grommet 31. As an example of each of the grommets 30 and 31, a grommet shown in FIG. 15 may be employed. The grommet 30 (31) shown in FIG. 15 comprises a pipe-like body which has an upper flange 30a (31a) and a lower flange 30b (31b) and is divisible into two along a vertical direction. The grommet 30 (31) is attached to the portion of the stay 21 in a manner such that the upper flange 30a (31a) is located beneath the seat back 12 and the lower flange 30b (31b) is located on the seat cushion 11, whereby the hole of the back frame 16 through which the upper portion of the stay is inserted and a portion of the padding 110 through which the lower portion of the stay is inserted are concealed in a manner not to be visible.

Figure 16:
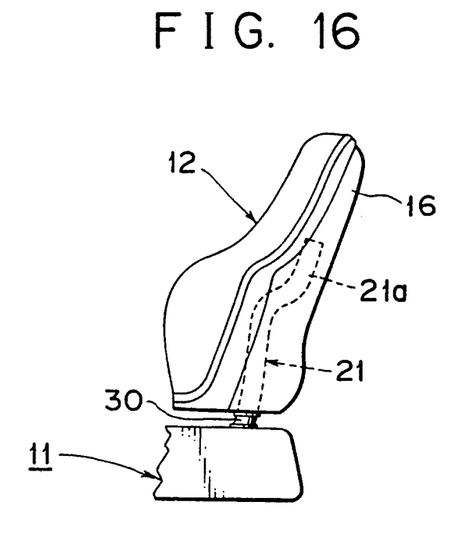
FIG. 16 is a schematic side view of the seat shown in FIG. 3, in which the seat cushion is segmentally shown.
Figure 17:
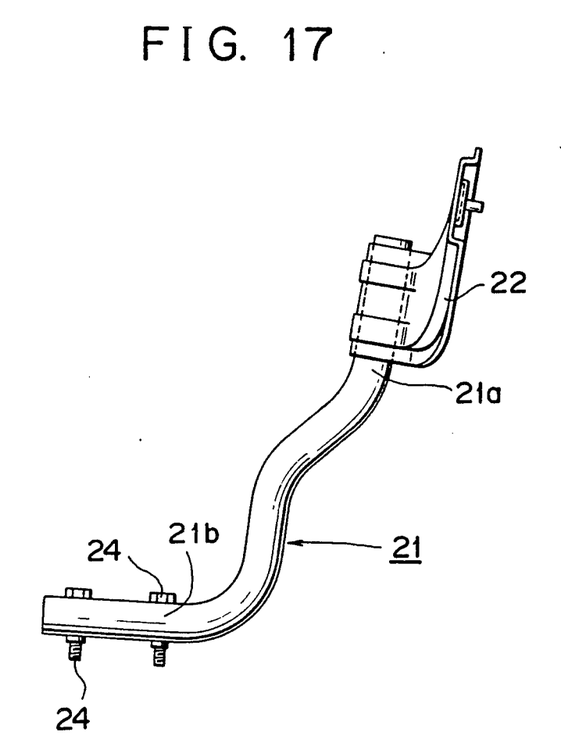
FIG. 17 is a schematic side view of the stay shown in FIG. 14.

Incidentally, the seat back 12 comprises the padding 120 bulged to a relatively large degree at the left and right side portions of its lower section I (see FIG. 4) as described above, so that it is desirable that the upper portions of the stays which positionally correspond to ones of the respective bulged portions 121 and 122 (see FIG. 4) of the padding 120 are gradually curved rearwardly so as to be stepped and in a manner to have the substantially same curvature as that of the curved surfaces of the bulged portions of the padding as shown in FIGS. 16 and 17. In this case, the large bulged portions of the padding 120 can be stably supported through the so-curved stays, and even though a padding 120 being thinned at its upper section II (see FIG. 4) is employed, the upper portions of the stays will not permit an operator, sitting on the seat cushion 11, to have a feeling of physical disorder.

In the seat 10 of the present invention constructed as described above, the cushioned padding 110 of the seat cushion 11 has the ridge portions 111 and 112 at the left and right side portions thereof as described above, so that the completed seat cushion 11 itself also has ridge portions 11a and 11b at its left and right side portions as shown in FIG. 3, and the cushioned padding 120 of the seat back 12 has the bulged portions 121 and 122 at the left and right side portions of the lower section I thereof as described above, so that the completed seat back 12 itself also has the bulged portions 12a and 12b at its left and right side portions as shown in FIG. 3. Thus, it will be noted that the seat 10 according to the present invention can ensure the stable supporting of an operator's hip and both sides. In addition to this, the seat 10 according to the present invention will not fatigue the operator sitting on the seat 10 even though he drives a special vehicle, which is equipped with the seat 10, for many hours. Also, the forward section of the padding 110 is flatwise formed as described above whereby the completed seat cushion 11 is also relatively flat at its forward section, so that an operator sitting on the seat 10, when he depresses pedals of the vehicle, can freely move the lower half of his body, especially, his feet. The upper section II of the padding 120 is flatwise formed as described above whereby the upper section of the completed seat back 12 is relatively flat, so that the operator, when he is obliged to twist the upper half of his body in order to look to the sides and/or the rear, can smoothly drive the special vehicle without any trouble. Furthermore, in the seat 10 of the present invention, each of the stays 21 is inserted at its upper portion 21a into the seat back 12 and inserted at its lower portion 21b into the seat cushion 11 and is surrounded by the grommet 30 (31) at its portion which is exposed between the seat cushion 11 and the seat back 12, whereby the entire stays 21 are hidden, so that the completed seat 10 is of good appearance and may strike people as a high-grade article. In addition, each of the stays is arranged in a manner such that the upper portion 21a of the stay 21 positionally corresponds to one of the left and right ridge portions 111 and 112 of the padding 110, so that the stays will not permit an operator, sitting on the seat 10, to have a feeling of physical disorder. Furthermore, the upper portion 21a of each stay 21 may be gradually curved rearwardly so as to be stepped and secured to the back frame 16, and the lower portion 21b of each stay 21 may be fitted into the recess portion 150 of the bottom frame 15 to be secured to the bottom frame 15, so that even though a padding 120 being thinned at its portions, which positionally correspond to the upper portions 21a of the stays 21 when the padding 120 is attached to the back frame 16 for assembly and a padding 110 being thinned at its portions, which positionally correspond to the lower portions 21b of the stays 21 when the padding 110 is attached to the bottom frame 15 for assembly, are employed, the stays will not allow an operator, sitting on the seat 10, to have a feeling of physical disorder.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A seat for a special vehicle, comprising:
    a seat cushion including a substantially horizontal bottom frame, a first cushioned padding connected to said bottom frame, and a first covering sheet;
    a seat back including a back frame standing up and spaced from said bottom frame, a second cushioned padding connected to said back frame, and a second covering sheet; and
    means for interconnecting said seat cushion and said seat back, said interconnecting means including a pair of elongated stays, each of said elongated stays being obtuse-angularly curved at a substantially middle portion thereof so as to allow said back frame to be supported obliquely relative to said bottom frame;
    said bottom frame including a body having two spaced recess means each receiving a lower portion of one of said elongated stays, said two spaced recess means being provided at left and right regions, respectively, near a rear end of said body of said bottom frame;
    said back frame including a body having a peripheral rising portion and two spaced hole means each allowing an upper portion of the one of said elongated stays to be inserted therethrough;
    said interconnecting means further including first fastening means and second fastening means;
    each of said stays being received at the lower portion thereof in one of said two spaced recess means of said bottom frame and secured to said bottom frame by said first fastening means, and inserted at the upper portion thereof through one of said two spaced hole means of said back frame and secured to said back frame by said second fastening means, thereby interconnecting said bottom frame and said back frame;
    said first cushioned padding including a body having two spaced ridge portions formed integrally therewith, said ridge portions extending along left and right sides of said body of said first cushioned padding from a rear end thereof to approximately a middle of said sides;
    said first cushioned padding being arranged on said bottom frame with said ridge portions facing upwardly and such that said ridge portions are positioned at locations corresponding to those of the lower portions of said stays which are secured to said bottom frame;
    said second cushioned padding comprising a body having a lower section and an upper section, said lower section having two spaced bulged portions integrally formed with said second cushioned padding and extending along left and right sides thereof such that said lower section has a substantially C-shape in cross section, said upper section being substantially flat;
    said second cushioned padding being arranged on said back frame with a surface thereof, on which said bulged portions are formed, being an outer surface and such that said bulged portions are positioned at locations corresponding to those of the upper portions of said stays which are secured to said back frame;
    said first covering sheet covering said first cushioned padding; and
    said second covering sheet covering said second cushioned padding.

2. A seat for a special vehicle as defined in claim 1, wherein each of said stays is surrounded at a portion thereof by a grommet which is exposed between said seat back and said seat cushion.

3. A seat for a special vehicle as defined in claim 1, wherein each of said two spaced recess means of said bottom frame includes a recess.

4. A seat for a special vehicle as defined in claim 1, wherein each of said two spaced hole means of said back frame includes a through-hole.

5. A seat for a special vehicle as defined in claim 1, wherein each of said bulged portions has a curved surface and wherein the upper portion of each of said stays is curved so as to have substantially the same curvature as that of said curved surface of a respective one of said bulged portions.

6. A seat for a special vehicle as defined in claim 1, wherein said first cushioned padding covered with said first covering sheet is attached to said bottom frame by one of a first belt molding and a first elongated open trim, and said second cushioned padding covered with said second covering sheet is attached to said back frame by one of a second belt molding and a second elongated open trim.

7. A seat for a special vehicle as defined in claim 1, wherein said second covering sheet includes a terminal portion secured to said peripheral rising portion of said back frame by one of a belt molding and an elongated open trim to attach said second cushioned padding covered with said second covering sheet to said back frame, said one of said belt molding and elongated open trim being arranged along said peripheral rising portion of said back frame and being forwardly curved at portions thereof positioned at said bulged portions of said second cushioned padding so that said forwardly curved portions have substantially the same curvature as that of a curved surface of each of said bulged portions, thereby allowing a shape of each of said bulged portions to be maintained.

8. A seat for a special vehicle as defined in claim 1, further including at least one means for tilting said seat cushion.

9. A seat for a special vehicle as defined in claim 8, wherein said at least one tilting means includes a first elongated member attached to said bottom frame, and a second elongated member pivotally connected at one end thereof to said first elongated member and pivotally connected at another end thereof to a floor of said special vehicle.

10. A seat for a special vehicle as defined in claim 9, and further comprising a shock absorber mounted on a bottom surface of said first elongated member.

11. A seat for a special vehicle, comprising a seat cushion, a seat back, and means for interconnecting said seat cushion and said seat back, said seat cushion including a horizontally arranged bottom frame, a first cushioned padding on said bottom frame, and a first covering sheet covering said first cushioned padding, said first cushioned padding on said bottom frame including a body having two spaced ridge portions integrally formed therewith, said ridge portions extending along left and right sides of said first padding from a rear end of said body of said first cushioned padding to approximately a middle of said sides of said first cushioned padding, said first cushioned padding being arranged on said bottom frame with a surface thereof, on which said ridge portions are formed, facing up, said seat back including a back frame standing up and spaced from said bottom frame, said back frame having a peripheral portion, a second cushioned padding provided on said back frame, and a second covering sheet covering said second cushioned padding, said second cushioned padding on said back frame including a body having a lower section and an upper section, said lower section having two spaced bulged portions integrally formed at left and right sides of a surface thereof in such a manner that said lower section has a substantially C-shape in cross section, said upper section being substantially flat, said second cushioned padding being arranged on said back frame with a surface thereof, on which said bulged portions are formed, being an outer surface, said interconnecting means being arranged between said bottom frame and said back frame, the improvement comprising:

said second covering sheet having a terminal portion; and means for securing said terminal portion of said second covering sheet to said peripheral portion of said back frame, said securing means including one of a belt molding and an elongated open trim, said one of said belt molding and elongated open trim being positioned along said peripheral portion of said back frame and being forwardly curved at portions thereof, positioned at said bulged portions of said second cushioned padding in such a manner that said forwardly curved portions have substantially the same curvature as that of a curved surface of said bulged portions, said second cushioned padding covered with said second covering sheet being attached to said back frame by said securing means when said terminal portion is secured to said peripheral portion of said back frame by one of said belt molding and elongated open trim, thereby allowing a shape of each of said bulged portions of said second cushioned padding to be maintained as it is so that said seat back has bulged portions rising to a relatively higher degree at left and right side portions, as compared to a central portion of said lower section of said second cushioned padding.

12. A seat for a special vehicle as defined in claim 11, and further comprising first fastening means and second fastening means; said interconnecting means including a pair of elongated stays, each of said elongated stays being obtuse-angularly curved at a substantially middle portion thereof; said bottom frame comprising a body having two spaced recess means each receiving a lower portion of one of said elongated stays, said two spaced recess means being provided at left and right regions near a rear end of said body of said bottom frame; said back frame having a rising portion formed along the peripheral portion thereof, said rising portion having two spaced hole means each allowing an upper portion of the one of said elongated stays to be inserted therethrough; each of said elongated stays being received at the lower portion thereof in one of said two spaced recess means of said bottom frame and secured to said bottom frame by said first fastening means, and inserted at the upper portion thereof through one of said two spaced hole means of said back frame and secured to said back frame by said second fastening means; and wherein said first cushioned padding is arranged on said bottom frame such that said ridge portions are positioned at locations corresponding to those of the lower portions of said stays which are secured to said bottom frame, and said second cushioned padding is arranged on said back frame such that said bulged portions are positioned at locations corresponding to those of the upper portions of said stays.

13. A seat for a special vehicle as defined in claim 12, wherein each of said stays is surrounded by a grommet at a portion thereof which is exposed between said seat back and said seat cushion.

14. A seat for a special vehicle as defined in claim 12, wherein each of said two spaced recess means of said bottom frame includes a recess.

15. A seat for a special vehicle as defined in claim 12, wherein each of said two spaced hole means of said back frame includes a through-hole.

16. A seat for a special vehicle as defined in claim 13, wherein the upper portion of each of said stays is curved so as to have substantially the same curvature as that of a curved surface of the corresponding one of said bulged portions of said second cushioned padding.

17. A seat for a special vehicle as defined in claim 11, and further comprising at least one means for tilting said seat.

18. A seat for a special vehicle as defined in claim 17, wherein said at least one tilting means includes a first elongated member attached to said bottom frame, and a second elongated member pivotally connected at one end portion thereof to said first elongated member and pivotally connected at another end portion thereof to a floor of said special vehicle.

19. A seat for a special vehicle as defined in claim 18, and further comprising a shock absorber mounted on a bottom surface of said first elongated member.

* * * * *